Patented May 26, 1931

1,806,838

UNITED STATES PATENT OFFICE

ABRAHAM BRILL, OF YOUNGSTOWN, OHIO, ASSIGNOR TO THE REPUBLIC RUBBER COMPANY, OF YOUNGSTOWN, OHIO, A CORPORATION OF OHIO

RUBBER TIRE AND ANALOGOUS ARTICLE OF MANUFACTURE

Application filed December 28, 1926. Serial No. 157,597.

My present invention relates to novel and improved articles of manufacture, including particularly solid truck tires comprising a plurality of sections of rubber associated together in a special grain relationship providing a highly tenacious and durable bond between the sections. As will be hereinafter explained, the invention is capable of embodiment, in its broader aspects, in articles of manufacture other than the elastic vehicle tires which form a typical exemplification of the invention and in terms of which the invention will be hereinafter described.

The present application for Letters-Patent is in part a continuation of my application Serial No. 136,198, filed in the United States Patent Office on September 17, 1926, for this same product, which will hereinafter be more fully set forth and finally claimed.

In the accompanying drawings which forms part of this application for Letters-Patent, and whereon corresponding reference characters indicate like parts in the several views.

Figure 1:
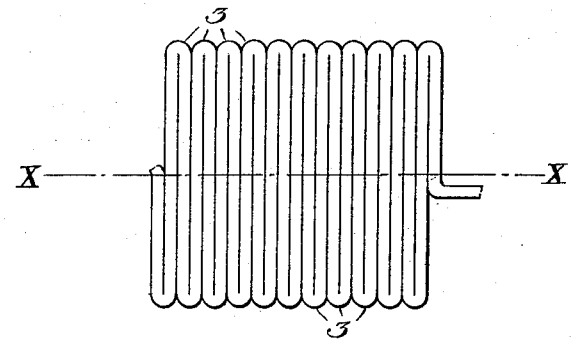
Figure 1 is a fragmentary side elevation of a convolute or continuous strip of plasticized and uncured rubber stock, suitably compounded to form tread sections of truck tires.

The invention described below is applicable to any product in which two dissimilar rubbers are required to be combined with a union which will not readily separate. Two outstanding examples of such a product are rubber covered steel rolls such as used for paper mill work, etc., and truck tires.

In the building of solid rubber truck tires, the common practice is, first, to put on the steel band a layer of rubber which will cure hard on vulcanization and on this there is placed the soft curing tread rubber. This is either put on by plying from the calender or by applying a tread, which has been previously run to size and shape from a tube machine.

When a rubber stock is run on the calender, there is produced, as is well known, a distinct grain in the direction of the run. The same effect is produced on the outside depths of a tubed slab, due to the drag of the die face on the stock. This grain effect, which exists in the unvulcanized stock persists in the vulcanized rubber. When a calendered layer of tread rubber is vulcanized to a layer of rubber which will vulcanize hard under the vulcanizing conditions, this grain effect is accentuated to the extent that distinct cleavage planes are formed in the tread rubber. When the tread is forcibly torn from the hard rubber, the separation is either at the junction of the two rubbers or the tread rubber tears in a plane parallel to the junction, that is, in the direction of the calendered grain. The probable explanation for this accentuation of cleavage is that some of the sulphur migrates from the hard rubber to the softer rubber, (that is the one containing lower sulphur) forming strata of over-vulcanized weak rubber, which strata run parallel with the calendered grain.

I have found that the cleavage planes, previously referred to, which produce weak unions between hard and soft curing rubbers are not formed when calendered stock is built up in such a manner that the end grain of the tread rubber is in juxtaposition to the hard curing rubber.

When calendered tread rubber is run onto a hard curing rubber in the ordinary manner and vulcanized, the tread rubber adjacent to the hard rubber seems to have a grain effect similar to that existing in wood. That is, the tearing strength is considerably greater across the grain than with it.

This invention is based on this principle. In other words, by this method of building up, the calender grain is perpendicular to the face of the hard curing rubber. When a combination of stocks so prepared is vulcanized, the tread does not split in a plane parallel to the junction of the two rubbers but tears with a jagged tear and requires a considerably greater pull to cause separation.

Reference being had to the drawings forming part of this application for Letters-Patent, and to the numerals thereon, the present invention will be hereinafter particularly described.

In the construction of solid truck tires dissimilar rubber stocks are used in the same tire because of the necessity of using next to the metal wheel-rim a base rubber so compounded that it will become very hard when vulcanized, and next to this base a rubber stock so compounded that it will remain relatively soft and yielding for tread purposes, after vulcanization.

A primary object of the present invention therefore is to provide a tire or analogous article of manufacture having firmly united base and tread portions as aforesaid. One method by which this product may be produced is as follows:

Plasticized rubber from an ordinary warming mill (not shown), is first run through ordinary calendering rolls (not shown), and wound thence directly upon a suitable metal wheel-rim A, A, (Figures 2 and 3), mounted to rotate freely in front of the calender.

Figure 2:
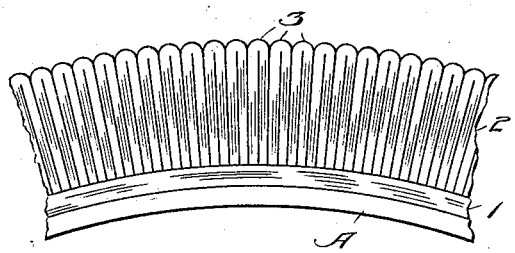
Figure 2 is also a fragmentary side elevation of one half section of the stock illustrated by Figure 1, applied to a tire base, and metal wheel rim.
Figure 3:
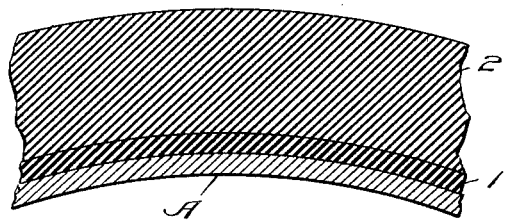
Figure 3 is likewise a fragmentary view being a vertical central section through one complete truck tire, base and rim constructed in accordance with the present invention.

The rubber stock thus applied to the usual metallic rim A eventually becomes the hard rubber tire-base shown at 1, Figures 2 and 3, and, as is well understood by persons skilled in the art to which the present improvements relate, possesses a distinct grain extending longitudinally, or in the direction of the run of the rolls.

Heretofore it has been customary to next apply to the tire-base 1 aforesaid, directly from the calendering rolls, laminations of plasticized uncured tread rubber 2, so compounded that it will remain soft and pliable after vulcanization. Or, in some instances the entire tread 2 is first run to the required size and shape from a tube machine, applied directly over the tire-base 1, and secured to the latter during vulcanization. If the tire tread is thus built up from strips of plasticized rubber fed directly from the calendering rolls, the grain as aforesaid is produced by the run of the rolls and exists throughout the entire laminated tread. On the other hand, if the tread 2 is produced in slab form by agency of a tube machine, and then super-imposed upon the tire base 1, there is still a distinct grain produced, but in the latter event such distinct grain occurs only adjacent the exterior surfaces of the slab, due to the drag of the die face on the stock.

In either case however, prior to my present invention, when the plasticized tread rubber 2 was applied to the plasticized base rubber 1, and united by vulcanization, the grain of the said base 1 and tread rubber 2 ran in parallel lines, and was accentuated to the extent that distinct cleavage planes were produced, and if the former was forcibly torn from the latter the separation took place either at the junction of the two, or the tread rubber 2 would tear in a plane parallel with the junction, that is to say, in the direction of and with the calendered grain referred to, this naturally being the line of least resistance.

As a means therefore of eliminating this parallelism of grain in the rubber stocks from which the tire base 1 and tread 2 are formed, with the resulting cleavage planes as aforesaid, and of securing a more intimate and permanent union between the base portions 1 and tread portions 2 of truck or other tires, my present method provides further that as the suitably compounded plasticized, uncured rubber comes from the calendering rolls in a continuous strip of suitable and uniform thickness, and of a width to meet requirements of the particular tire tread under construction, it is first convoluted or folded back and forth upon itself as illustrated by Figure 1, with its individual convolutes 3 in close contact, and substantially in alinement. The resulting body of uncured tread rubber is then slabbed or cut centrally and horizontally, thus dividing it about equally upon the dot and dash line X—X, and producing two tread sections 2, 2. One of these sections of suitable length, is next wound around, or superposed upon, the base 1 previously applied to the wheel-rim A, as clearly indicated by Figure 2, whereupon the method is completed by vulcanization in a suitable mold as usual.

When thus completed of course, the individual convolutes 3, are blended into one common mass of tread rubber, and the same is true of the hard rubber base 1. It will be particularly noted however, that the cleavage planes referred to, which heretofore have resulted in weak unions between hard and soft curing rubbers, are not formed when calendered stock is built up in such a manner that the end grain of the tread rubber 2 is in juxtaposition to the longitudinal grain of the hard curing rubber base 1, and as a consequence, it will further be noted that the tearing strength is much greater across the grain than with it, just exactly as is the case with the grain of wood.

The present invention is based upon this same principle, and by this plan of building up the calendered grain of the tread section 2 of tires, in lines perpendicular to the face of the hard curing tire base 1, the tread does not split in a plane parallel to the junction of the two dissimilar rubbers, but, if force enough is presented, tears in a jagged uneven line, and requires a far greater strain to cause separation.

This being a description of my present invention in one form of embodiment, it should be understood that I consider myself by no means limited to the exact method described, or product produced, but on the contrary lay claim to any and all modifications thereof capable of producing substantially the same results.

It is to be understood further that I make no claim to any specific method of producing the novel article which forms the subject of this application. On the contrary, my claims are directed exclusively to the article, however produced, and are not to be considered limited by any method of manufacture. Neither is the invention, in its broader aspects, to be considered limited to the use in the associated rubber sections of rubber of differing characteristics, although I prefer to employ in the article in which the invention is embodied one kind of rubber for the base portion and another kind of rubber for the tread or exterior portion.

Having thus described my invention what I now claim and desire to secure by Letters Patent is:

1. An elastic tire having base and tread sections formed of rubbers of dissimilar character, the calendered grain of one section arranged at an angle to that of the other section.

2. An elastic tire having a hard rubber base and a relatively soft rubber tread, the calendered grain of said tread arranged at an angle to that of the tire base.

3. An article of manufacture formed from a plurality of grained rubber sections so disposed that any plane parallel with the grain of one section intersects any plane parallel with the grain of another section.

4. An article of manufacture formed from a plurality of grained rubber sections so disposed that any plane parallel with the grain of one section is substantially normal to any plane parallel with the grain of another section.

5. An article of manufacture formed from a plurality of grained rubber sections so disposed that all the grain in one section is disposed in planes nonparallel with the plane of the grain of another section.

6. An elastic vehicle tire formed of base and tread sections of grained rubber so disposed that any plane parallel with the grain of the base section intersects any plane parallel with the grain of the tread section.

7. An elastic vehicle tire having a cylindrical rubber base provided with a circumferential grain, in combination with a rubber tread mounted on the base and provided with a grain disposed radially of the base.

8. An elastic vehicle tire having a hard rubber cylindrical base provided with a circumferential grain, in combination with a soft rubber tread mounted on the base and provided with a grain related to the grain of the base as radii to a cylinder.

9. A solid vehicle tire comprising a hard rubber cylindrical base provided with a circumferential grain, in combination with a soft rubber tread mounted on the base and provided with a grain related to the grain of the base as radii to a cylinder, the base and tread rubbers being permanently vulcanized together to form a unitary whole.

In testimony whereof I affix my signature.

ABRAHAM BRILL.